Patented Sept. 12, 1944

2,358,055

UNITED STATES PATENT OFFICE 2,358,055

CONCENTRATION OF MANGANESE ORES

Frank J. Cahn, Chicago, Ill., assignor to The Emulsol Corporation, Chicago, Ill.

No Drawing. Continuation of application Serial No. 412,005, September 23, 1941. This application July 21, 1942, Serial No. 451,739

16 Claims. (Cl. 209—49)

My invention is concerned with the art of separating mineral constituents of ores and is particularly concerned with agglomeration processes for the separation and recovery of the mineral values of certain types of ores, especially manganese dioxide or pyrolusite from manganese ores containing silica or a siliceous gangue.

I have discovered that certain substances, hereinafter described, have the property of agglomerating certain minerals, particularly manganese dioxide or pyrolusite, so that the agglomerated material can readily be separated from the gangue or undesired constituents of the ores. The agents which accomplish this purpose are hydrophilic colloids of a type which have the property of swelling but not dissolving in water and which form a non-continuous colloidal aqueous gel. Representative examples of such materials are gun karaya and gum bengal. Hydrophilic colloids which do not have such properties and which, therefore, are unsuitable for the practice of my invention as, for example, pectin, starch, methyl celluloses, and the like, may, by certain treatments for the purpose of altering their surface modifying properties, be rendered suitable for utilization in accordance with my present invention. I have found that gum karaya is exceptionally satisfactory and its use, therefore, represents an important, though limited, aspect of my invention. A simple test to determine those hydrophilic colloids which are satisfactory for the practice of my invention may be carried out by taking 2 grams of —100 +200 "Three Kids" or similar manganese or other ore, agitating the same in about 10 cc. of water in a test tube and allowing the ore to settle out, the height or volume of the settled ore being noted. Thereupon 2 or 3 milligrams of the hydrophilic colloid to be tested, in the form of a 0.1% aqueous dispersion, is added to the test tube, shaken, and allowed to settle. If the hydrophilic colloid is one which is suitable for the practice of my invention, the settled ore will have a materially increased volume, in many cases as much as a 60% increase in volume or even higher.

In accordance with my invention, the ore, particularly a pyrolusite ore of the "Three Kids" type, is wet ground, sized, for example, to —100 +200 mesh or —48 +80 mesh, made up to a suspension or slurry with water, and the resulting suspension or slurry is then stirred or agitated with a suspension of the gum karaya or the like. The manganese minerals agglomerate, apparently attaching to and collecting on the discrete globules of gum karaya, thereby forming larger particles. The agglomerated manganese particles may then be separated in any suitable manner, in the presence of water, by sieving, classifying, or the like. An effective manner of carrying out the separation is to use an inclined enamel pan or trough, the ore mass being washed downwardly with a slow stream of water. In this case, the agglomerated manganese particles pass downwardly more rapidly than does the non-agglomerated gangue.

The following examples are illustrative of the practice of my invention as applied to the treatment of a manganese dioxide or pyrolusite ore, the so-called "Three Kids" ore. It will be understood that the examples are not to be construed as being in any way limitative of the scope of my invention. Thus, for example, various changes may be made with respect to reagent choice, proportions of reagents, selection of particular ores and the like, which will be clear to those versed in the art in the light of the guiding principles disclosed herein.

Example I 50 grams of the moist ore of —48 +80 mesh were made into a slurry with 15 cc. of water. 10 cc. of a 0.1% gum karaya aqeous dispersion were then added thereto, the mixture was agitated, and it was then wet-panned on a 48 mesh sieve 8 inches in diameter. That which remained on the sieve was denoted as Fraction #1. The material which passed through the sieve was agitated with 5 cc. of the aforesaid gum karaya dispersion and again wet-panned on a 48 mesh sieve. That which remained on the sieve was denoted as Fraction #2. The material which passed through the sieve was agitated with 5 cc. of the gum karaya dispersion and again wet-panned on a 48 mesh sieve. That which remained on the sieve was denoted as Fraction #3. The material which passed through the sieve was agitated with 5 cc. of the gum karaya dispersion and wet-panned on a 48 mesh sieve. That which remained on the sieve was denoted as Fraction #4 and the material which passed through the sieve was denoted as Fraction #5. An analysis of the various fractions is shown in the following table. Combined Fractions #1, #2, #3 and #4 show a 73.5% recovery of a concentrate analyzing 44.0% manganese, the gum karaya consumption amounting to about 1.5 lbs. of gum karaya per ton of ore.

|  | Weight, grams | Per cent Mn | Grams Mn |
|---|---|---|---|
| #1 | 6.1 | 44.85 | 2.74 |
| #2 | 4.5 | 43.55 | 1.96 |
| #3 | 5.2 | 43.5 | 2.26 |
| #4 | 2.7 | 43.8 | 1.18 |
| #5 | 14.8 | 19.9 | 2.94 |
| Head | 33.3 | 33.3 | 11.08 |

The gum karaya suspension was made by boiling 1 part of gum karaya with a thousand parts of water for 10 minutes whereupon a smooth viscous mass resulted. On standing for several hours, the cold suspension separated into two layers, a lower gum agglomerate and a clear serum. The gum agglomerate layer constituted approximately 90% of the total volume. The gum karaya suspension utilized in the above example and in the following examples was the aforementioned layer of gum globules.

Example II 100 grams of the moist ore of −100 +200 mesh were made into a slurry with 50 cc. of water. 40 cc. of an aqueous dispersion of gum karaya (0.001 gram of gum karaya per cc.) were then added to the ore slurry and the mixture was agitated. It was then wet-panned on an 80 mesh sieve. That which remained on the sieve was designated as Fraction #1. The material which passed through the sieve was treated with 5 cc. of the gum dispersion and it was again wet-panned on an 80 mesh sieve, that remaining on the sieve being designated as Fraction #2 and the material which passed through the sieve was denoted as Fraction #3. About 12.9 grams of a concentrate analyzing about 43.8% manganese were recovered, the gum karaya consumption amounting to about 1.55 lbs. per ton of ore. The manganese recovery was about 63%.

The following table indicates the analytical results obtained:

| Fraction | Grams | Percent Mn | Grams Mn |
|---|---|---|---|
| 1 | 25.9 | 43.85 | 11.35 |
| 2 | 3.6 | 43.2 | 1.55 |
| 3 | 28.5 | 26.7 | 7.62 |
| Head | 58.0 | 35.4 | 20.52 |

Example III 100 grams of the moist ore −100 +200 mesh were made into a slurry with 50 cc. of water and there were added thereto, with agitation, 20 cc. of an aqueous dispersion of gum karaya (0.001 gram of gum karaya per cc.). The material was wet-panned on a 100 mesh sieve, that which remained on the sieve being designated as Fraction #1. The material which passed through the sieve was agitated with 5 cc. of the gum karaya dispersion and again wet-panned on a 100 mesh sieve, that which remained on the sieve being designated as Fraction #2 and the material which passed through the sieve being designated as Fraction #3. A total of 16.93 grams of a concentrate analyzing 40.9% manganese was obtained with a consumption of about 0.79 lbs. of gum karaya per ton of ore. The manganese recovery was about 81.6%.

The following table indicates the analytical results obtained:

| Fraction | Grams | Per cent Mn | Grams Mn |
|---|---|---|---|
| 1 | 32.8 | 41.3 | 13.55 |
| 2 | 5.6 | 39.3 | 2.38 |
| 3 | 22.0 | 17.3 | 3.81 |
| Head | 63.4 | 32.7 | 20.74 |

It will be understood, of course, that the various hydrophilic colloids of the character which may be utilized in accordance with my invention will vary in their efficacy and this variation will also occur with respect to different ores which may be separated by the use thereof. In the same general connection, it will be understood that the optimum proportions of the hydrophilic colloids will also be variable although, as a rule, amounts of the order of, at most, a few pounds per ton of ore will be utilized. In general, I prefer to employ from about 0.8 to about 2.0 pounds of gum karaya or the like per ton of manganese ore although this amount may be varied. Those skilled in the art will, in the light of my teachings, readily be able to adapt my invention to the treatment of particular ores.

It will also be understood that the hydrophilic colloids which are utilized in accordance with my invention may be employed together with one or more already known agents such as collecting agents, depressing agents, emulsifying agents, dispersing agents, activating agents, deactivating agents, inhibitors, and, in general, organic and inorganic conditioning agents, and the like.

This application is a continuation of my prior application, Serial No. 412,005, filed September 23, 1941.

While the invention has been described in detail it is to be understood that the scope thereof is not to be limited other than as set forth in the claims.

What I claim as new and desire to protect by Letters Patent of the United States is:

1. A method of concentrating manganese minerals which comprises agitating a manganese ore, in an aqueous medium, with a small proportion of a hydrophilic colloid having the property of swelling but not dissolving in water and of forming a non-continuous colloidal aqueous gel, and separating the agglomerated particles from the mass.

2. A method of concentrating manganese minerals which comprises agitating a manganese ore, in an aqueous medium, with a small proportion of gum karaya, and separating the agglomerated particles from the mass.

3. A method of concentrating manganese minerals which comprises agitating a manganese ore, in an aqueous medium, with a small proportion of gum bengal, and separating the agglomerated particles from the mass.

4. A method of concentrating manganese dioxide which comprises agitating an aqueous suspension of a manganese dioxide ore with a suspension of gum karaya, and separating the agglomerated particles of manganese dioxide from the mass.

5. A method of concentrating manganese dioxide which comprises agitating an aqueous suspension of a manganese dioxide ore with an aqueous suspension of gum karaya, and separating the agglomerated particles of manganese dioxide from the mass.

6. A method of concentrating manganese dioxide which comprises agitating an aqueous suspension of a manganese dioxide ore with a suspension of gum bengal, and separating the agglomerated particles of manganese dioxide from the mass.

7. A method of concentrating pyrolusite which comprises agitating a pyrolusite ore, in an aqueous medium, with a small proportion of a hydrophilic colloid having the property of swelling but not dissolving in water and of forming a non-continuous colloidal aqueous gel, and separating the agglomerated pyrolusite particles from the mass.

8. A method of concentrating manganese dioxide present in ores of the "Three Kids" type which comprises agitating an aqueous suspension of the ground ore with an aqueous suspension containing a small percentage of gum karaya, the amount of gum karaya employed being of the order of, at most, a few pounds per ton of the ore treated, and separating the agglomerated particles of manganese dioxide from the mass.

9. A method of concentrating manganese dioxide present in the "Three Kids" manganese ores which comprises agitating an aqueous suspension of the ground ore with an aqueous suspension containing a small percentage of gum karaya, the amount of gum karaya employed being of the order of, at most, a few pounds per ton of the ore treated, and separating the agglomerated particles of manganese dioxide from the mass.

10. A method of concentrating manganese dioxide present in the "Three Kids" manganese ores, which comprises agitating an aqueous suspension of the ground ore with an aqueous suspension containing a small percentage of gum bengal, the amount of gum bengal employed being of the order of, at most, a few pounds per ton of the ore treated, and separating the agglomerated particles of manganese dioxide from the mass.

11. A method of concentrating manganese dioxide which comprises agitating an aqueous suspension of a manganese dioxide ore containing a siliceous gangue with an aqueous suspension of a hydrophilic colloid having the property of swelling but not dissolving in water and of forming a non-continuous colloidal aqueous gel, the amount of said colloid being of the order of, at most, a few pounds per ton of ore treated, and separating the agglomerated particles of manganese dioxide from the mass.

12. A method of concentrating manganese dioxide which comprises agitating an aqueous suspension of a manganese dioxide ore containing a siliceous gangue with an aqueous suspension of gum karaya, the amount of the gum karaya being of the order of, at most, a few pounds per ton of ore treated, and separating the agglomerated particles of manganese dioxide from the mass.

13. A method of concentrating manganese dioxide which comprises agitating an aqueous suspension of a manganese dioxide ore containing a siliceous gangue with an aqueous suspension of gum bengal, the amount of the gum bengal being of the order of, at most, a few pounds per ton of ore treated, and separating the agglomerated particles of manganese dioxide from the mass.

14. A method of concentrating manganese minerals which comprises agitating a manganese ore, in an aqueous medium, with a small proportion of a hydrophilic colloid having the property of swelling but not dissolving in water and of forming a non-continuous colloidal aqueous gel, and separating the agglomerated particles from the mass by passing the mass through a sieve or screen having openings of such size as will retain the agglomerated particles thereon but will allow the non-agglomerated particles to pass therethrough.

15. A method of concentrating manganese dioxide present in ores of the "Three Kids" type which comprises agitating an aqueous suspension of the ground ore with an aqueous suspension containing a small percentage of gum karaya, the amount of gum karaya employed being of the order of, at most, a few pounds per ton of the ore treated, and separating the agglomerated particles of manganese dioxide from the mass by passing the mass through a sieve or screen having openings of such size as will retain the agglomerated particles thereon but will allow the non-agglomerated particles to pass therethrough.

16. A method of concentrating manganese dioxide which comprises agitating an aqueous suspension of a manganese dioxide ore containing a siliceous gangue with an aqueous suspension of gum karaya, the amount of the gum karaya being of the order of, at most, a few pounds per ton of ore treated, and separating the agglomerated particles of manganese dioxide from the mass by passing the mass through a sieve or screen having openings of such size as will retain the agglomerated particles thereon but will allow the non-agglomerated particles to pass therethrough.

FRANK J. CAHN.